June 17, 1952     W. P. DALRYMPLE     2,600,976

VALVE

Filed Oct. 23, 1947

*INVENTOR.*
WILLIAM P. DALRYMPLE
BY
*Wallace and Cannon*

ATTORNEYS

Patented June 17, 1952

2,600,976

UNITED STATES PATENT OFFICE 2,600,976

VALVE

William P. Dalrymple, Rochester, N. Y., assignor to American Brake Shoe Company, Wilmington, Del., a corporation of Delaware Application October 23, 1947, Serial No. 781,588

4 Claims. (Cl. 251—8)

This invention relates to valves and more specifically to valves of the type particularly adapted to controlling the flow of compressed air into spray guns and the like.

In the operation of spray guns or the like, air is normally fed under pressure to the gun from a suitable pressure unit or the like, and it is a primary object of my invention to efficiently, and in a novel and practical manner, control the air flow from such a pressure source to the gun.

An object ancillary to the foregoing is to regulate the air flow from a pressure source of a spray gun or the like, in a novel and expeditious manner without the necessity of unsightly, cumbersome and easily disturbed projecting operating mechanisms.

It is a further object of my invention to enable a novel control valve to be constructed which embodies a relatively few separate parts and which may be economically manufactured and is readily assembled.

Another object of my invention is to construct a valve in such a manner that a valve member therein may be actuated in a novel and expeditious manner to effect accurate and positive control of the flow of compressed air or other working fluid through the valve.

Yet another object of my invention is to enable the valve of the aforementioned character to be constructed wherein the various working parts thereof may be relatively large and of sturdy construction, and the construction of the valve as a whole is such that the valve is relatively difficult to damage or otherwise knock out of adjustment.

A further object of my invention is to construct a novel valve: which may be readily assembled; which, when so assembled, affords a valve which is sturdy in construction and the parts thereof are firmly connected together; and which, if it is desired to disassemble the valve for the purpose of cleaning the various parts thereof or replacing one or more of the various parts, may be readily disassembled.

Another object of my invention is to construct a substantially cylindrical-shaped valve of the aforementioned type which embodies a body member having a valve seat therein, a valve member adjustable toward and away from the valve seat to adjust the control setting of the valve, and an adjusting member associated with the body member and the valve member in such a manner that the valve member may be adjusted toward and away from the valve seat in a novel and expeditious manner by actuation of the adjusting member.

A further object of my invention is to afford a novel substantially cylindrical-shaped valve of the type especially well adapted to be used on a spray gun for controlling the flow of compressed air thereinto, which embodies a body member, valve member and an adjusting member, and wherein the valve member is of a novel substantially T-shaped construction, one of the legs of the T comprising a valve head for controlling the flow of air through the valve, and the other two legs of the T comprising members engageable with the aforesaid adjusting member to thereby afford means for adjusting the position of the aforesaid valve head.

An object ancillary to the foregoing is to afford a valve embodying a valve member of the aforementioned type wherein the valve head is adapted to be moved into and out of engagement with a valve seat to thereby control the flow of compressed air, or the like, through the valve, and wherein the two legs of the T-shaped valve member which are engaged with the adjusting member have threads formed on the outer end surface thereof engageable with complementary threads formed on the adjusting member so that by rotation of the adjusting member adjustment of the valve head toward and away from the valve seat may be effected.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 1:
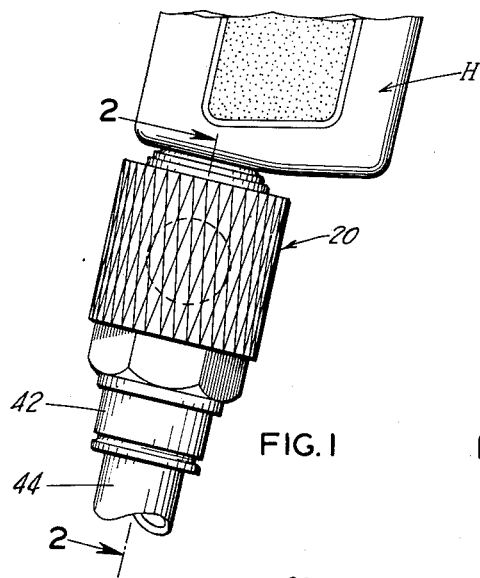
Fig. 1 is a perspective view of a valve embodying the principle of my invention, showing the valve as it would appear when connected to the handle of a spray gun in operative position thereon.

The valve 20 shown in the accompanying drawing to illustrate the principle of my invention, comprises, in general, a body member 22, a valve member 24 and a suitable adjusting member such as a collar 26.

The body member 22 is substantially cylindrical in shape and has an opening or passageway 28 extending longitudinally therethrough, the passageway 28 varying somewhat in diameter so as to form a reduced passageway or throat 30 through one end portion of the body member 22, and an enlarged passageway or chamber 32 through the other end portion thereof, a shoulder 34 being formed between the throat 30 and the chamber 32 of the passageway 28 and affording a valve seat therein. Two aligned openings 33 and 35 extend transversely through the side wall of the body member 22 and open into the chamber 32.

One end portion of the body member 22 comprises an externally threaded coupling nipple 36 by which my novel valve may be readily connected to a suitable coupling member, or as shown in Fig. 1, may be directly connected to the handle H of a spray gun. The other end portion of the body member 22 comprises an internally threaded coupling nut 38 by which my novel valve may be connected to a suitable coupling member such as, for example, the coupling member 42 attached to the air hose 44 shown in Fig. 1.

The valve member 24 comprises a substantially T-shaped member having three legs 52, 54 and 55, and is mounted in the chamber 32 in the body member 22 in such a manner that the legs 54 and 55 project outwardly through the openings 33 and 35, and the leg 52 extends toward and is positioned adjacent to the shoulder 34. The leg 52 comprises the head of the valve member 24 which is adapted to be moved into and out of valve closing position relative to the valve seat, afforded by the shoulder 34 and the lower extension of throat 30, to effect variation of the control setting of my valve as will be discussed in greater detail presently. The two legs 54 and 55 have threads 57 formed on the outer surface thereof for a purpose which will be further discussed hereafter.

Figure 2:
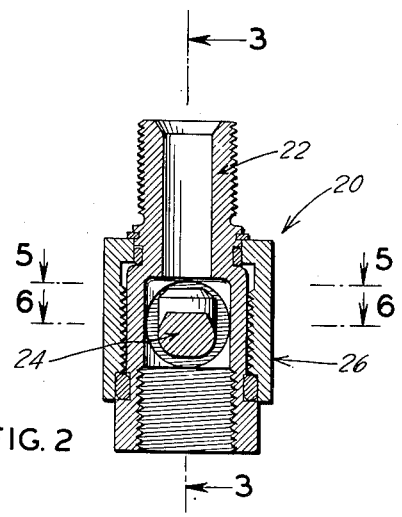
Fig. 2 is a sectional view taken substantially along the line 2—2 in Fig. 1.
Figure 4:
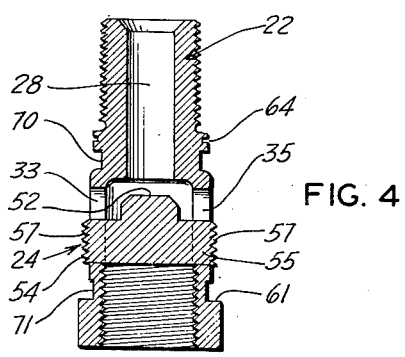
Fig. 4 is a detail sectional view corresponding to Fig. 3 but showing the body member and valve member of my valve with the adjusting member thereof removed.

It will be noted that, as is best seen in Figs. 2 and 4, the valve member 24 is of such size that, when the collar member 26 of my valve 20 is not in position on the body member 22, the valve member 24 may be readily inserted into, and removed from, the body member 22 through the openings 33 or 35.

The collar 26 has internal threads 59 which when the collar 26 is mounted in operative position on the body member 22, are operatively engaged with the threads 57 on the legs 54 and 55 of the valve member 24. When so mounted on the body member 22, one end of the collar 26 abuts an externally projecting shoulder 61 afforded by one end portion of the coupling nut 38, and the collar 26 is held in such engagement with the shoulder 61 by a snap-ring 63 mounted in a suitable groove 64 formed in the outer surface of the body member 22. The internal diameter of the collar 26 is such that, with the snap-ring 63 removed from the groove 64, the collar may be readily mounted on, or removed from the body member 22 by sliding it over the coupling nipple 36. Two O-rings 66 and 67 are mounted in suitable grooves 70 and 71 formed in the body member 22 and are positioned between the body member 22 and the collar 26 to afford effective sealing against the escape of air therebetween when my valve is in use.

Figure 3:
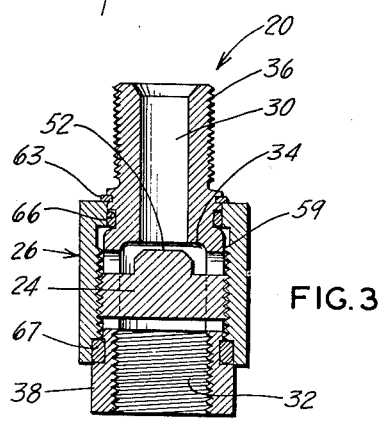
Fig. 3 is a sectional view taken substantially along the line 3—3 in Fig. 2.
Figure 5:
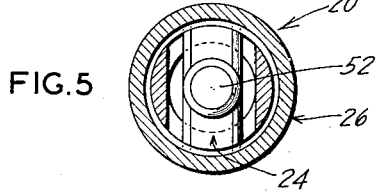
Fig. 5 is a detail sectional view taken substantially along the line 5—5 in Fig. 2.
Figure 6:
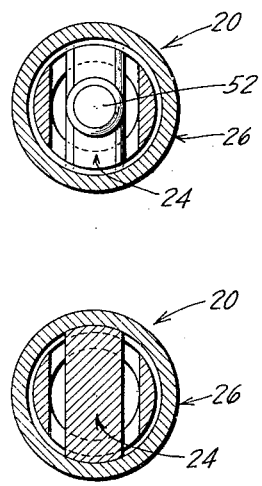
Fig. 6 is a detail sectional view taken substantially along the line 6—6 in Fig. 2.

In the assembly of my novel valve 20 the valve member 24 may be inserted through either of the openings 33 or 35 into the position shown in Fig. 4 in the body member 22. The O-rings 66 and 67 may then be placed in the grooves 70 and 71, respectively, and the collar member 26 may then be slipped over the coupling nipple 36 into position on the body member 22 wherein the teeth 59 on the collar member 26 engage the teeth 57 on the legs 54 and 55 of the valve member 24. The collar member 26 may then be rotated in the proper direction to advance the threads 59 over the threads 57 and thereby move the collar member 26 into engagement with the shoulder 61 on the body member 22, and the snap-ring 63 may then be placed in position in the groove 64 to thereby hold the collar member 26 against longitudinal movement on the body member 22. Upon completion of the assembly of my valve 20 in the aforesaid manner it will be noted that the valve member 24 will be substantially in the position shown in Fig. 4 relative to the body member 22, in which position the valve head 52 is spaced the extreme limit from the shoulder 34. Adjustment of the valve member 24 from the position shown in Fig. 4 to a position closer to the valve seat 34, such as, for example, the position of the valve member 24 shown in Fig. 3, may be readily accomplished in my novel valve 20 by rotating the collar member 26 in the proper direction to advance the threads 57 on the valve member 24 along the threads 59 on the collar member 26. As previously discussed the legs 54 and 55 of the valve member 24 are of sufficient length that when the valve member 24 is mounted in the body member 22 in operative position the legs 54 and 55 project outwardly through the openings 33 and 35 and, therefore, it will be apparent that the legs are of sufficient length that, when the collar member 26 is rotated in the aforesaid manner to advance the valve member 24 toward the valve seat afforded by the shoulder 34, the legs 54 and 55 will engage the peripheral edges of the openings 33 and 35, as best seen in Fig. 7, to thereby hold the valve member 24 against rotation so that the rotation of the threads 59 with the collar member 26 is effective through the engagement of the threads 59 with the threads 57, to move the valve member 24 toward the valve seat 34.

Figure 7:
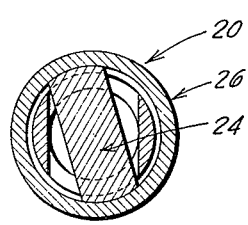
Fig. 7 is a detail sectional view corresponding to Fig. 6 but showing the valve member of my novel valve in a different position than that shown in Fig. 6.

It will be apparent to those skilled in the art that movement of the valve member 24 away from closed position relative to the valve seat, defined by the lower extension of throat 30 and the shoulder 34, may likewise be effected by rotation of the collar member 26 in the opposite direction, at which time the legs 54 and 55 of the valve member 24 will engage the sides of the openings 33 and 35 opposite to the sides thereof with which they are shown engaged in Fig. 7.

Thus it will be seen that in the use of my novel valve 20: the coupling nipple 36 may be screwed into a suitable coupling member, or as shown in Fig. 4, directly into inlet air passage in the handle H of a spray gun, or the like; an air hose may then be screwed into the coupling nut 38 to thereby complete the connection of the handle H of the spray gun to the hose, a suitable coupling member such as, for example, the coupling member 42 shown on the air hose 44 in the drawings being preferred for making such interconnection between the air hose and the valve 20. When thus connected between an air hose and a spray gun, the valve 20 affords an effective means for controlling the flow of compressed air into the spray gun.

From the foregoing it will be seen that I have provided a novel valve wherein the various parts thereof are relatively large and sturdily constructed.

Also, it will be noted that I have provided a novel valve which has relatively few working parts and wherein the working parts are so constructed that they may be readily manufactured.

Also, it will be noted that the working parts of my novel valve may be readily and quickly assembled and disassembled, and, when assembled, are firmly held together and afford a compact and practical valve for controlling the flow of compressed air and the like, to devices such as, for example, spray guns.

Furthermore, it will be noted that I have provided a valve embodying a novel valve member which is of novel construction and operates in a novel and expeditious manner.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. A valve member comprising an elongated one-piece body member having a passageway extending longitudinally therethrough and having two openings extending transversely therethrough and interconnecting with said passageway, a valve member mounted in said passageway, said valve member having three leg portions and being of such a size that it may be moved into and out of said passageway through one of said openings, one of said leg portions being positioned in said passageway and extending in longitudinal alignment therewith and each of the other two of said leg portions extending outwardly through a corresponding one of said openings, each of said other two leg portions having threads formed on the outer end thereof, and a collar rotatably mounted on said body member, said collar having threads formed on the internal surface thereof complementary to said threads on said other two leg portions of said valve member, said threads on said collar member being operatively engaged with said threads on said other two leg portions of said valve member for moving said valve member longitudinally of said passageway upon rotation of said collar member.

2. A valve comprising a substantially cylindrical-shaped body member having a passageway extending longitudinally therethrough and having openings extending therethrough transversely to said passageway, said body member having an annular-shaped shoulder formed integrally therein and encircling a portion of said passageway to afford a valve seat, a one-piece valve member mounted in said passageway in position for movement into sealing engagement with said shoulder and having portions extending outwardly through said openings, said valve member being of such size that it may be moved into and out of said passageway through one of said openings, and a collar member rotatably mounted on said body member and operatively engaged with said portions of said valve member for moving said valve member into and out of sealing engagement with said shoulder to thereby open and close said passageway.

3. A valve of the type adapted to connect a spray gun to an air hose, comprising an elongated body member having coupling means formed on one end for connecting said body member to such a spray gun and other coupling means formed on the other end for connecting said body member to such an air hose, said body member having a passageway extending longitudinally therethrough, an annular valve seat formed in said body member and encircling a portion of said passageway, an annular shoulder formed on the outer surface of said body member and extending therearound, a valve member mounted in said body member, said valve member having a valve head operable to engage said valve seat to thereby close said passageway and two oppositely disposed leg members extending transversely to said valve head, said leg members projecting outwardly through said body member transversely to said passageway and having threads formed on the outer ends thereof, a collar member rotatably mounted on said body member in engagement with said shoulder, a retaining member removably mounted on said body member in engagement with said collar member and releasably holding said collar member in engagement with said shoulder member, and sealing means mounted between said collar member and said body member for closing the connection therebetween, said collar member having threads formed internally thereof complementary to said threads on said leg members and operatively engaged therewith, said collar member being operable upon rotation thereof relative to said body member to move said valve member longitudinally of said passageway to thereby move said valve head toward engagement with said valve seat.

4. A valve comprising a one-piece substantially cylindrical-shaped body member having a passageway extending longitudinally therethrough and having a guide-slot extending therethrough transversely to said passageway, said body member having an integral, continuous annular-shaped shoulder therein encircling a portion of said passageway to afford a valve seat, a one-piece valve member mounted in said passageway for movement toward and away from said shoulder, said valve member having a plurality of legs, one of said legs being mounted in said passageway and extending in longitudinal alignment in position for movement into and out of seating engagement with said shoulder to thereby close and open said passageway, another of said legs extending outwardly through said guide-slot said valve member being of such size that it may be moved into and out of said passageway through said guide-slot, and a collar member rotatably mounted on said body member and operatively engaged with said other leg for moving said valve member toward and away from said shoulder to thereby move said one leg into and out of said seating engagement with said shoulder.

WILLIAM P. DALRYMPLE.

REFERENCES CITED

The following references are of record in the file of this patent:

UNITED STATES PATENTS

| Number | Name | Date |
|---|---|---|
| 633,069 | Busha | Sept. 12, 1899 |
| 1,340,107 | Blache | May 11, 1920 |
| 1,542,406 | Pfeiffer | June 16, 1925 |
| 1,652,929 | Cawood | Dec. 13, 1927 |
| 1,759,060 | Moore | May 20, 1930 |
| 2,016,998 | Hartke | Oct. 8, 1935 |

FOREIGN PATENTS

| Number | Country | Date |
|---|---|---|
| 783,740 | France | of 1935 |
| 823,841 | France | of 1938 |